UNITED STATES PATENT OFFICE.

JOHN M. McCORMACK, OF RENO, NEVADA, ASSIGNOR TO GERTRUDE A. McCORMACK, DAVID R. WILLIAMS, JAMES CONSTABLE, AND ELLSWORTH L. BROWN, ALL OF RENO, NEVADA.

PROCESS OF REDUCING AND SEPARATING THE METALS FROM THEIR ORES.

1,099,388. Specification of Letters Patent. Patented June 9, 1914.

No Drawing. Application filed April 22, 1913. Serial No. 762,971.

*To all whom it may concern:*

Be it known that I, JOHN M. McCORMACK, a citizen of the United States, residing at Reno, in the county of Washoe and State of Nevada, have invented new and useful Improvements in the Process of Reducing and Separating the Metals from Their Ores, of which the following is a specification.

This invention relates to the reduction of mineral bearing ores, that is to say, to the separation of the metal in such ores from the gangue or non-metallic substances.

The present invention is applicable to carbonates, oxids and not over 5% sulfids of copper, lead, antimony, silver, gold, nickel and other ores found in carbonate or oxid form, and the object of the invention is to reduce such ores to metal in the form of a commercial product by employing the extremely simple and inexpensive method hereinafter described, whereby the complete reduction to commercially pure metal is obtained by the application of a single reducing flame and without the use of any additional reducing agents or materials.

As the first or preliminary step of this process, the ore is ground or otherwise broken up so that it will pass a screen of from four to six mesh, according to the size of the mineral particles contained in the ore. The broken ore is then placed in a furnace similar to those commonly used for sintering or roasting ores. In this furnace the broken ore is subjected to the direct action of a single reducing flame of a temperature preferably not exceeding 2000 degrees Fahrenheit, the temperature of the flame used varying according to the metal in the ores being treated and being such as to reduce the ores and cause incipient fusion thereof. The temperature, of course, as stated, will vary with the character of ore under treatment, but in the treatment of different ores by this process, in order to successfully treat such ores, the temperature of the flame should be in ores including copper approximately 1950° F.; ores including gold, 1950° F.; ores including silver 1750° F.; ores including lead 600° F.; ores including antimony, 1150° F.; and ores including tin 450° F. These temperatures as a general proposition are approximately as given, although the same may vary slightly and will probably be slightly lower than that mentioned inasmuch as the actual melting points of the metals are lower. The flame is assisted by any sulfids that may be present in the ores under treatment, and to this end carbonate, oxid and sulfid ores may be mixed in certain proportions for treatment in order to get the best results. The surplus sulfur, if any, will pass off in the form of sulfur dioxid gas.

As a result of the treatment of the broken ores by the direct flame the gangue will be prepared for easy and profitable concentration of the metal particles therein by any well known method. I make no claim to the process of concentration used, but simply to the method of reducing the minerals in ores to metallic form so that concentration thereof is sure and easy and the percentage of saving is increased over any previously known method of preparing the gangue for concentration. Should it be found that some of the metal still remains in the tailings after the ore treated by my process has been passed over any suitable concentrating device, then said tailings may be reground and again passed over the concentrating device until practically all of the metal therein has been extracted.

Having thus fully described my invention, what I claim as new and desire to secure by Letters Patent of the United States is:—

1. A process of reducing metals in carbonate oxid and sulfid ores, which consists in breaking up the ores, then subjecting said broken ores to the direct contact of a single flame at a temperature sufficient to reduce the ores and cause incipient fusion thereof, whereby the metals in the ores are completely reduced to commercially pure metal.

2. A process of reducing metals in carbonate oxid and sulfid ores, which consists in breaking up the ores, then subjecting said broken ores to the direct contact of a single flame of a temperature sufficient to reduce the ores and cause incipient fusion thereof, whereby the metals in the ores are completely reduced to commercially pure metal, and finally separating the metal from the gangue.

J. M. McCORMACK.

Witnesses:
 E. L. Brown,
 D. R. Williams.